US012785211B2

(12) United States Patent
Saito et al.

(10) Patent No.: US 12,785,211 B2
(45) Date of Patent: Nov. 3, 2026

(54) SEPARATOR FOR ELECTRIC STORAGE DEVICE AND ELECTRIC STORAGE DEVICE

(71) Applicants: Celgard, LLC, Charlotte, NC (US); ASAHI KASEI KABUSHIKI KAISHA, Tokyo (JP)

(72) Inventors: Shun Saito, Tokyo (JP); Kazunori Uchida, Tokyo (JP); Hisashi Takeda, Düsseldorf (DE)

(73) Assignees: CELGARD, LLC, Charlotte, NC (US); ASAHI KASEI KABUSHIKI KAISHA, Tokyo (JP)

( * ) Notice: Subject to any disclaimer, the term of this patent is extended or adjusted under 35 U.S.C. 154(b) by 772 days.

(21) Appl. No.: 18/076,463

(22) Filed: Dec. 7, 2022

(65) Prior Publication Data

US 2023/0335860 A1 Oct. 19, 2023

Related U.S. Application Data

(60) Provisional application No. 63/286,577, filed on Dec. 7, 2021.

(51) Int. Cl.

*H01M 50/417* (2021.01)
*H01M 50/449* (2021.01)
*H01M 50/491* (2021.01)

(52) U.S. Cl.

CPC ....... *H01M 50/417* (2021.01); *H01M 50/449* (2021.01); *H01M 50/491* (2021.01)

(58) Field of Classification Search

CPC ............. H01M 50/417; H01M 50/451; H01M 50/491; H01M 50/457; H01M 50/489

See application file for complete search history.

(56) References Cited

U.S. PATENT DOCUMENTS

| | | | | |
|---|---|---|---|---|
| 11,152,667 | B2 * | 10/2021 | Sasaki | H01M 4/622 |
| 2015/0380777 | A1 * | 12/2015 | Takahashi | H01M 4/621 320/162 |
| 2016/0211549 | A1 * | 7/2016 | Gayot | H01M 6/181 |
| 2018/0037704 | A1 * | 2/2018 | Ishiguro | B29C 48/0018 |
| 2020/0035972 | A1 | 1/2020 | Ahn et al. | |
| 2020/0219796 | A1 * | 7/2020 | Shi | H01M 50/44 |
| 2022/0181744 | A1 | 6/2022 | Takahashi et al. | |
| 2023/0282933 | A1 * | 9/2023 | Hamasaki | H01M 10/0525 429/254 |

FOREIGN PATENT DOCUMENTS

| | | | | |
|---|---|---|---|---|
| CA | 2771872 | * | 10/2013 | |
| JP | 2008-307890 | A | 12/2008 | |
| JP | 2009-045774 | A | 3/2009 | |
| JP | 2011-073277 | A | 4/2011 | |
| JP | 2012-007156 | A | 1/2012 | |
| JP | 6103921 | B2 * | 3/2017 | |
| WO | WO2018/089748 | A1 | 5/2018 | |
| WO | WO2019/103947 | | 5/2019 | |
| WO | WO-2020196120 | A1 * | 10/2020 | H01M 50/449 |
| WO | WO-2021247964 | A1 * | 12/2021 | H01M 50/417 |

OTHER PUBLICATIONS

Machine translation of JP6103921 done Jun. 2, 2025 (Year: 2025).*

Bicy et al., Facile fabrication of microporous polypropylene membrane separator for lithium-ion batteries, Materials Chemistry and Physics, vol. 255, Nov. 15, 2020. (Year: 2020).*

Machine translation WO-2020196120-A1.*

* cited by examiner

*Primary Examiner* — Jennifer Dieterle

(74) *Attorney, Agent, or Firm* — J. Clinton Wimbish; Maynard Nexsen PC

(57) ABSTRACT

[Problem] To provide a separator for electric storage devices that suppresses dendrite short circuits and has excellent thermal stability.

[Solution] Provided is a separator for electric storage devices including: (A) a microporous layer mainly composed of (X) polypropylene; and (B) a microporous layer containing (Y) polypropylene identical or different from the polypropylene (X) and a thermoplastic elastomer that is incompatible with the polypropylene (Y). In an ND-MD sectional observation of the microporous layer (B), the area-averaged long pore diameter of pores present in the microporous layer (B) is from 150 nm to 500 nm.

7 Claims, No Drawings

SEPARATOR FOR ELECTRIC STORAGE DEVICE AND ELECTRIC STORAGE DEVICE

FIELD

The present disclosure relates to a separator for electric storage devices and the like.

BACKGROUND

A microporous film, in particular, a polyolefin-based microporous film, is used in many technical fields such as a microfiltration film, a separator for batteries, a separator for capacitors, and a material for fuel cells, and in particular is used as a separator for electric storage devices such as lithium secondary batteries and lithium-ion secondary batteries. Lithium-ion batteries are used in a variety of applications, such as small electronic devices, including cell phones and notebook personal computers, as well as electric vehicles, including hybrid vehicles and plug-in hybrid vehicles.

In recent years, lithium-ion batteries with high energy capacity, high energy density, and high output characteristics have been required, and this has increased demand for separators that are thin film and have excellent battery performance, battery reliability, and safety.

For example, Patent Literature 1 describes a multilayer microporous film that can improve characteristics including dielectric breakdown and strength. A preferable multilayer microporous film includes a microlayer and one or more layered barriers.

Cited Literature 2 describes a separator for electric storage devices containing a microporous film, the main component of which is polyolefin, having a melt tension of 30 mN or less when measured at a temperature of 230° C. and a melt flow rate (MFR) of 0.9 g/10 min or less when measured at a load of 2.16 kg and a temperature of 230° C.

CITATION LIST

Patent Literature

[PTL 1] WO 2018/089748
[PTL 2] WO 2020/196120

SUMMARY

Technical Problem

In electric storage devices, lithium dendrites generated during charging and discharging permeate and grow in a separator, causing a short circuit between a positive electrode and a negative electrode. As batteries become larger, there is a need for separators with excellent permeability and dimension stability, even after exposure to high temperatures. Therefore, an object of the present disclosure is to provide a separator for electric storage devices that suppresses dendrite short circuits and has excellent thermal stability.

Solution to Problem

Examples of embodiments of the present disclosure are listed in items [1] to [9] below.

[1]

A separator for electric storage devices comprising:

(A) a microporous layer mainly composed of (X) polypropylene; and (B) a microporous layer containing (Y) polypropylene identical or different from the polypropylene (X) and a thermoplastic elastomer that is incompatible with the polypropylene (Y), wherein an area-averaged long pore diameter of pores present in the microporous layer (B) in an ND-MD sectional observation of the microporous layer (B) is from 150 nm to 500 nm.

[2]

The separator for electric storage devices according to Item 1, wherein the thermoplastic elastomer above has a block copolymer structure.

[3]

The separator for electric storage devices according to Item 2, wherein the block copolymer contains a styrene-containing unit.

[4]

The separator for electric storage devices according to Item 3, wherein the thermoplastic elastomer has a styrene content of from 1 wt % to 50 wt %, based on the total weight of the thermoplastic elastomer.

[5]

The separator for electric storage devices according to any one of Items 1 to 4, wherein the separator for electric storage devices has a permeability of from 10 sec/100 $cm^3$ to 300 sec/100 $cm^3$.

[6]

The separator for electric storage devices according to any one of Items 1 to 5, wherein the microporous layer (A) has a melt flow rate (MFR) of 0.7 g/10 min or less.

[7]

The separator for electric storage devices according to any one of Items 1 to 6, wherein the microporous layer (B) has a melt flow rate (MFR) of 1.1 g/10 min or less.

[8]

An electric storage device comprising a positive electrode, a negative electrode, and the separator for electric storage devices according to any one of Items 1 to 7 arranged between the positive electrode and the negative electrode.

[9]

The electric storage device according to Item 8, wherein the positive electrode contains lithium iron phosphate as a positive electrode active material.

Advantageous Effects of Invention

According to the present disclosure, a separator for electric storage devices which suppresses a dendrite short circuit and has excellent thermal stability is provided.

DESCRIPTION OF EMBODIMENTS

<<Separator For Electric Storage Devices>>

The separator for electric storage devices of the present disclosure comprises a separator substrate comprising (A) a microporous layer mainly composed of polypropylene and (B) a microporous layer mainly composed of polypropylene. The separator substrate may further comprise a coating layer (also referred to as "surface layer," "covering layer," or the like, and hereinafter simply referred to as "coating layer") on the microporous layer (A) and/or the microporous layer (B). Herein, "microporous layer" means each microporous layer constituting a substrate of a separator, "separator substrate"

means a base material of a separator excluding any coating layer, and "separator" means the entire separator including any coating layer.

<Microporous Layer (A)>

The separator for electric storage devices of the present disclosure comprises (A) a microporous layer. The separator for electric storage devices may comprise only one microporous layer (A) or two or more microporous layers (A). At least one of the microporous layers (A) preferably constitutes the outermost layer of at least one side of a separator substrate. When a separator for electric storage devices comprises two or more microporous layers (A), the microporous layers (A) may constitute the outermost layers of both sides of a separator substrate. The microporous layer (A) is mainly composed of polypropylene (X), which can maintain a favorable battery performance even after storage at high temperatures (for example, 130° C.). Herein, "mainly composed of" polypropylene means containing 50 wt % or more of polypropylene, based on the total weight of the microporous layer (A). The lower limit of the content of polypropylene in the microporous layer (A) is 50 wt % or more, preferably 55 wt % or more, 60 wt % or more, 70 wt % or more, 80 wt % or more, 90 wt % or more, or 95 wt % or more, from the viewpoint of wettability, thinning, and shutdown characteristics, and the like, of a separator. The upper limit of the content of polypropylene in the microporous layer (A) is not limited, but may be, for example, 60 wt % or less, 70 wt % or less, 80 wt % or less, 90 wt % or less, 95 wt % or less, 98 wt % or less, or 99 wt % or less, and may be 100 wt %.

<Material of Microporous Layer (A)>

The microporous layer (A) is mainly composed of polypropylene (X), and may be the same material as the polypropylene (Y) of the microporous layer (B) described below, or may be a polypropylene with a different chemical structure, more specifically, a polypropylene in which at least one of the monomer composition, the stereo-regularity, the molecular weight, the crystal structure, and the like is different.

Examples of the stereo-regularity of polypropylene include, without limitation, an atactic, isotactic, or syndiotactic homopolymer. The polypropylene of the present disclosure is preferably an isotactic or syndiotactic highly crystalline homopolymer.

The polypropylene of the microporous layer (A) is preferably a homopolymer, and may be a copolymer in which a small amount of a comonomer other than propylene, for example an α-olefin comonomer, is copolymerized, for example a block polymer. The amount of propylene structure contained in polypropylene as a repeating unit is not limited, and may be, for example, 70% by mole or more, 80% by mole or more, 90% by mole or more, 95% by mole or more, or 99% by mole or more. The amount of a repeating unit derived from a comonomer other than a propylene structure contained in polypropylene is not limited, and may be, for example, 30% by mole or less, 20% by mole or less, 10% by mole or less, 5% by mole or less, or 1% by mole or less. Polypropylene may be used singly, or two or more kinds thereof may be used in a mixture.

The weight average molecular weight (Mw) of polypropylene in the microporous layer (A) is preferably 300,000 or more from the viewpoint of strength or the like of the microporous layer and dendrite suppression, and preferably 1,300,000 or less from the viewpoint of ensuring favorable film formability and productivity. The Mw of polypropylene is more preferably from 500,000 to 1,200,000, more preferably from 650,000 to 1,100,000, more preferably from 750,000 to 1,000,000, and particularly preferably from 800,000 to 1,000,000.

The upper limit of the value (Mw/Mn) obtained by dividing the weight average molecular weight (Mw) of polypropylene in the microporous layer (A) by the number average molecular weight (Mn) is preferably 20 or less, and more preferably 18 or less, 16 or less, 14 or less, or 12 or less. By setting Mw/Mn to 20 or less, favorable film formability and productivity tend to be ensured. Mw/Mn is preferably 3 or more, and more preferably 4 or more, 4.5 or more, or 5.0 or more. The larger the value of Mw/Mn of polypropylene, the larger the melt tension of a microporous layer obtained tends to be, and it is preferable to increase the melt tension of the microporous layer (A) in suppressing dendrites. Therefore, it is preferable for the value of Mw/Mn of polypropylene to be 3 or more in order to control the melt tension of the microporous layer (A) at a high level. The weight average molecular weight, the number average molecular weight, and Mw/Mn of the polyolefin of the present disclosure are molecular weights in terms of polystyrene obtained by GPC (gel permeation chromatography) measurement.

The density of polypropylene in the microporous layer (A) is preferably 0.85 g/cm$^3$ or higher, for example, 0.88 g/cm$^3$ or higher, 0.89 g/cm$^3$ or higher, or 0.90 g/cm$^3$ or higher. The density of polypropylene is preferably 1.1 g/cm$^3$ or less, for example, 1.0 g/cm$^3$ or less, 0.98 g/cm$^3$ or less, 0.97 g/cm$^3$ or less, 0.96 g/cm$^3$ or less, 0.95 g/cm$^3$ or less, 0.94 g/cm$^3$ or less, 0.93 g/cm$^3$ or less, or 0.92 g/cm$^3$ or less. The density of polyolefin is related to the crystallinity of polypropylene, and a density of 0.85 g/cm$^3$ or higher for polypropylene improves the productivity of microporous layers, which is particularly advantageous in the dry method.

<Melt Flow Rate (MFR) of Microporous Layer (A)>

The upper limit of the melt flow rate (MFR) (MFR of a single layer) of the microporous layer (A) is, from the viewpoint of obtaining a microporous layer (A) with higher strength and from the viewpoint of suppressing dendrite short circuit, preferably 4.0 g/10 min or less, and may be, for example, 3.0 g/10 min or less, 2.0 g/10 min or less, 1.5 g/10 min or less, 1.1 g/10 min or less, 0.7 g/10 min or less, or 0.5 g/10 min or less. The lower limit of MFR (single layer MFR) of the microporous layer (A) is not limited from the viewpoint of formability of the microporous layer (A), or the like, and may be 0.2 g/10 min or more, 0.25 g/10 min or more, 0.3 g/10 min or more, or 0.35 g/10 min or more. The MFR of the microporous layer (A) is measured under a load of 2.16 kg and a temperature of 230° C.

That the MFR of the microporous layer (A) is 4.0 g/10 min or less means that the molecular weight of the polyolefin in the microporous layer (A) is somewhat high. When a polyolefin has a high molecular weight, the number of tie molecules that bind the crystallites together increases, which tends to produce the microporous layer (A) with high strength and also tends to provide a sufficiently high melt tension to achieve a pore structure that suppresses dendrite short circuits. An MFR of the microporous layer (A) of 0.2 g/10 min or more prevents the melt tension of the microporous layer (A) from becoming too high, thereby ensuring favorable film formability and productivity.

The MFR of polypropylene in the microporous layer (A) is, from the viewpoint of obtaining a microporous layer (A) with high strength and high melt tension, preferably from 0.2 to 4.0 g/10 min when measured under a load of 2.16 kg and a temperature of 230° C. The upper limit of MFR of polypropylene may, from the viewpoint of obtaining a microporous layer with higher strength, be, for example, 4.0 g/10 min or less, 3.0 g/10 min or less, 2.0 g/10 min or less, 1.5 g/10 min or less, 1.1 g/10 min or less, or 0.5 g/10 min or less. The lower limit of MFR of polypropylene is not limited, and may, from the viewpoint of formability of the microporous layer (A), be, for example, 0.2 g/10 min or more, 0.25 g/10 min or more, 0.3 g/10 min or more, 0.35 g/10 min or more, or 0.35 g/10 min or more.

<Pentad Fraction of Microporous Layer (A)>

The lower limit of the pentad fraction of polypropylene in the microporous layer (A) may, from the viewpoint of obtaining a microporous layer with low permeability, preferably be 94.0% or higher, for example, 95.0% or higher, 96.0% or higher, 96.5% or higher, 97.0% or higher, 97.5% or higher, 98.0% or higher, 98.5% or higher, or 99.0% or higher. The upper limit of the pentad fraction of polypropylene is not limited, and may be 99.9% or less, 99.8% or less, or 99.5% or less. The pentad fraction of polypropylene is measured by $^{13}$C-NMR (nuclear magnetic resonance method).

A pentad fraction of polypropylene of 94.0% or more indicates that the crystallinity of polypropylene is high. A separator obtained by the stretch opening method, in particular the dry method, opens pores by stretching amorphous portions between crystallites, and therefore, when the crystallinity of polypropylene is high, the porosity is favorable and the permeability can also be kept low, which enables high output of a battery.

<Area-Averaged Long Pore Diameter of Microporous Layer (A)>

The area-averaged long pore diameter in an ND-MD section of the microporous layer (A) (hereinafter, also simply referred to as "area-averaged long pore diameter") is preferably from 50 nm to 400 nm. Herein, "ND" indicates the direction of thickness of a microporous layer, and "MD" indicates the direction of film formation of a microporous layer. For example, the MD of a separator containing a microporous layer is the longitudinal direction when the separator is a roll. The "long pore diameter" means the pore diameter in the MD. When the number of microporous layers (A) and/or microporous layers (B) is more than two, the area-averaged long pore diameters of the microporous layer (A) and the microporous layer (B) are compared based on the average area-averaged long pore diameter value of the respective layers. The lower limit of the area-averaged long pore diameter of the microporous layer (A), from the viewpoint of ensuring favorable output in an electric storage device, is preferably 50 nm or more, more preferably 80 nm or more, still more preferably 110 nm or more, particularly preferably 120 nm or more, and most preferably 130 nm or more. The upper limit of the area-averaged long pore diameter of the microporous layer (A), from the viewpoint of favorable dendrite short circuit suppression, is preferably 400 nm or less, more preferably 350 nm or less, still more preferably 300 nm or less, particularly preferably 250 nm or less, and most preferably 210 nm or less.

The area-averaged long pore diameter can be measured by sectional SEM observation of an ND-MD section of a separator and image analysis in the range of 20 μm MD×3 μm ND from an obtained image. Detailed conditions are given in Examples. When measuring the average pore diameter from a sectional SEM image, the number-averaged pore diameter and the area-averaged long pore diameter can be calculated, and in order to better correlate with the physical properties of a separator, the area-averaged long pore diameter is used as the average pore diameter herein.

<Porosity of Microporous Layer (A)>

The porosity of the microporous layer (A) is preferably 20% or more from the viewpoint of avoiding clogging in an electric storage device and obtaining favorable permeability of a separator, and is preferably 70% or less from the viewpoint of maintaining the strength of the separator. The porosity of the microporous layer (A) is more preferably from 25% to 65%, further preferably from 30% to 60%, and particularly preferably from 35% to 60%.

<Thickness of Microporous Layer (A)>

The thickness of the microporous layer (A), from the viewpoint of high energy density of an electric storage device and the like, may preferably be 10 μm or less, for example, 8 μm or less, 7 μm or less, 6 μm or less, 5 μm or less, 4.5 μm or less, or 4 μm or less. The lower limit of the thickness of the microporous layer (A), from the viewpoint of strength and the like, may preferably be 1 μm or more, for example, 2 μm or more, 3 μm or more, or 3.5 μm or more.

<Additive of Microporous Layer (A)>

The microporous layer (A), which is mainly composed of polypropylene, may further contain an additive such as an elastomer, a crystal nucleating agent, an antioxidant, or a filler, if necessary, in addition to polypropylene (X). The amount of an additive is not particularly limited, and may be, based on the total weight of the microporous layer (A), for example, from 0.01 wt %, 0.1 wt %, or 1 wt % to 20 wt % or less, 10 wt % or less, or 7 wt % or less. When the amount of an additive is 20% or less, high crystallinity and crystal orientation of polypropylene can be obtained, and favorable porosity can be achieved in a separator obtained by a stretch opening method, in particular, a dry method, and the permeability can be suppressed to a low level, thereby enabling high power output of a battery. When the microporous layer (A) contains an elastomer, the amount (wt %) is less than the amount (wt %) of an elastomer contained in the microporous layer (B).

<Microporous Layer (B)>

The separator for electric storage devices of the present disclosure comprises (B) a microporous layer. The separator for electric storage devices may comprise only one microporous layer (B) or two or more microporous layers (B). The microporous layer (B) contains: a polypropylene (Y) that is identical or different from the polypropylene (X); and a thermoplastic elastomer that is incompatible with the polypropylene (Y). The microporous layer (B) is composed of a resin composition mainly composed of polypropylene, which can maintain a favorable battery performance even after storage at high temperatures (for example, 130° C.). The lower limit of the content of polypropylene (Y) in the microporous layer (B) may be preferably 55 wt % or more, 60 wt % or more, 70 wt % or more, 80 wt % or more, or 85 wt % or more, from the viewpoint of wettability, thinning, and the like, of a separator. The upper limit of the content of polypropylene in the microporous layer (B) is not limited, but may be, for example, 60 wt % or less, 70 wt % or less, 80 wt % or less, 90 wt % or less, 96 wt % or less, or 99 wt % or less.

<Material of Microporous Layer (B)>

The microporous layer (B) is a resin composition containing a polypropylene (Y) identical or different from the polypropylene (X) and a thermoplastic elastomer that is incompatible with the polypropylene (Y). The polypropylene (Y) of the microporous layer (B) may be the same material as the polypropylene (X) of the microporous layer (A), or may be a polypropylene with a different chemical structure, more specifically, a polypropylene in which at least one of the monomer composition, the stereo-regularity, the molecular weight, the crystal structure, and the like is different.

Examples of the stereo-regularity of polypropylene of the microporous layer (B) include, without limitation, an atactic, isotactic, or syndiotactic homopolymer. The polypropylene of the present disclosure is preferably an isotactic or syndiotactic highly crystalline homopolymer.

The polypropylene of the microporous layer (B) is preferably a homopolymer, and may be a copolymer in which a small amount of a comonomer other than propylene, for example an α-olefin comonomer, is copolymerized, for example a block polymer. The amount of propylene structure contained in polypropylene as a repeating unit is not limited, and may be, for example, 70% by mole or more, 80% by mole or more, 90% by mole or more, 95% by mole or more, or 99% by mole or more. The amount of a repeating unit derived from a comonomer other than a propylene structure contained in polypropylene is not limited, and may be, for example, 30% by mole or less, 20% by mole or less, 10% by mole or less, 5% by mole or less, or 1% by mole or less. Polypropylene may be used singly, or two or more kinds thereof may be used in a mixture.

The weight average molecular weight (Mw) of polypropylene in the microporous layer (B) is preferably 250,000 or more from the viewpoint of strength or the like of the microporous layer, and preferably 1,000,000 or less from the viewpoint of increasing the pore diameter of the microporous layer and developing favorable dendrite suppression performance. The Mw of polypropylene is more preferably from 400,000 to 950,000, more preferably from 550,000 to 900,000, more preferably from 600,000 to 900,000, and particularly preferably from 700,000 to 900,000.

The upper limit of the value (Mw/Mn) obtained by dividing the weight average molecular weight (Mw) of polypropylene in the microporous layer (B) by the number average molecular weight (Mn) is preferably 7 or less, and more preferably 6.5 or less, 6 or less, 5.5 or less, or 5 or less. The smaller the value of Mw/Mn of polypropylene, the smaller the melt tension of a microporous layer obtained tends to be. Therefore, it is preferable for the value of Mw/Mn of polypropylene to be 7 or less to control the melt tension of the microporous layer (B) at a low level. Mw/Mn may preferably be 1 or more, for example, 1.3 or more, 1.5 or more, 2.0 or more, or 2.5 or more. When Mw/Mn is 1 or more, an appropriate molecular entanglement may be maintained, resulting in favorable stability during film formation. The weight average molecular weight, the number average molecular weight, and Mw/Mn of the polyolefin of the present disclosure are molecular weights in terms of polystyrene obtained by GPC (gel permeation chromatography) measurement.

The density of polypropylene in the microporous layer (B) is preferably 0.85 $g/cm^3$ or higher, for example, 0.88 $g/cm^3$ or higher, 0.89 $g/cm^3$ or higher, or 0.90 $g/cm^3$ or higher. The density of polypropylene is preferably 1.1 $g/cm^3$ or less, for example, 1.0 $g/cm^3$ or less, 0.98 $g/cm^3$ or less, 0.97 $g/cm^3$ or less, 0.96 $g/cm^3$ or less, 0.95 $g/cm^3$ or less, 0.94 $g/cm^3$ or less, 0.93 $g/cm^3$ or less, or 0.92 $g/cm^3$ or less. The density of polyolefin is related to the crystallinity of polypropylene, and a density of 0.85 $g/cm^3$ or higher for polypropylene improves the productivity of microporous layers, which is particularly advantageous in the dry method.

Examples of the thermoplastic elastomer of the macroporous layer (B) include polypropylene, a polyolefin other than polypropylene (also referred to as "another polyolefin"), and a copolymer of polystyrene and a polyolefin. Examples of polypropylene include low crystallinity polypropylene with a low stereo-regularity region. A polyolefin is a polymer that contains a monomer containing a carbon-carbon double bond as a repeating unit. Examples of the monomer constituting a polyolefin other than polypropylene include, without limitation, a monomer having 2 or 4 to 10 carbon atoms containing a carbon-carbon double bond, such as ethylene, 1-butene, 4-methyl-1-pentene, 1-hexene, and 1-octene. Polyolefin is, for example, a homopolymer, a copolymer, or a multi-step polymerization polymer, and, for example, can also contain polyethylene. Preferable examples of a copolymer of polystyrene and a polyolefin include styrene-(ethylene-propylene)-styrene copolymer (SEPS), styrene-(ethylene-butene)-styrene copolymer (SEBS), hydrogenated styrene-(ethylene-butene)-styrene copolymer (hydrogenated SEBS), styrene-ethylene-styrene copolymer, olefin crystal-(ethylene-butene)-olefin crystal copolymer (CEBC), hydrogenated olefin crystal-(ethylene-butene)-olefin crystal copolymer (hydrogenated CEBC), styrene-(ethylene-butene)-olefin crystal copolymer (SEBC), hydrogenated styrene-(ethylene-butene)-olefin crystal copolymer (hydrogenated SEBC). Particularly preferable are hydrogenated styrene-(ethylene-butene)-styrene copolymer (hydrogenated SEBS), hydrogenated styrene-(ethylene-butene)-olefin crystal copolymer (hydrogenated SEBC), and styrene-(ethylene-propylene)-styrene copolymer (SEPS).

<Thermoplastic Elastomer Incompatible with Polypropylene>

A thermoplastic elastomer in the microporous layer (B) is incompatible with the polypropylene (Y). This allows the thermoplastic elastomer to be favorably dispersed in the polypropylene (Y) to obtain a sufficiently large area-averaged long pore diameter. Examples of the thermoplastic elastomers that is incompatible with the polypropylene (Y) include, among the above, a copolymer of polystyrene and a polyolefin such as styrene-(ethylene-propylene)-styrene copolymer (SEPS), styrene-(ethylene-butene)-styrene copolymer (SEBS), hydrogenated styrene-(ethylene-butene)-styrene copolymer (hydrogenated SEBS), styrene-ethylene-styrene copolymer, olefin crystal-(ethylene-butene)-olefin crystal copolymer (CEBC), hydrogenated olefin crystal-(ethylene-butene)-olefin crystal copolymer (hydrogenated CEBC), styrene-(ethylene-butene)-olefin crystal copolymer (SEBC), or hydrogenated styrene-(ethylene-butene)-olefin crystal copolymer (hydrogenated SEBC). Other examples include a block copolymer containing a polyolefin unit such as ethylene, 1-butene, 4-methyl-1-pentene, 1-hexene, and 1-octene. The thermoplastic elastomer preferably has a block copolymer structure. The block copolymer more preferably contains a styrene-containing unit. This allows the elastomer to be favorably dispersed in the polypropylene (Y) without compatibility and to obtain a sufficiently large area-averaged long pore diameter.

<Styrene Content of Thermoplastic Elastomer>

The styrene content of a thermoplastic elastomers is the ratio of a styrene unit to another unit, which can be measured by NMR. A styrene derivative unit is one in which a functional group is attached to styrene.

The styrene content of a thermoplastic elastomer, based on the total weight of the thermoplastic elastomer, is from 1 wt % to 50 wt %, more preferably from 5 wt % to 40 wt %, and further preferably from 10 wt % to 30 wt %. When the styrene content is 50 wt % or less, the elastomer is favorably dispersed in the polypropylene (Y), resulting in a large pore diameter. When the styrene content is 1 wt % or more, the elastomer can maintain an incompatible dispersion state in the polypropylene (Y) without compatibility. When the pore diameter is large, it is easy to obtain a highly permeable microporous layer (B). Since the pore diameter can be controlled to be sufficiently large, dendrite short circuits in electric storage devices can be effectively suppressed.

The amount of the thermoplastic elastomer added, based on the total weight of the microporous layer (B), is preferably from 1 wt %, 3 wt %, or 4 wt % to 20 wt % or less, 15 wt %, or 12 wt % or less. When the amount is 1 wt % or more, the thermoplastic elastomer is favorably dispersed, and the pore size per pore after stretching and expansion can be increased. The large pore size can effectively suppress dendrite short circuits in electric storage devices. When the amount is 20 wt % or less, it is easy to obtain high crystallinity and high crystal orientation of polypropylene, and in a separator obtained by a stretch opening method, in particular, a dry method, the porosity is favorable and the permeability can be kept low, which enables high output of a battery.

The MFR of the thermoplastic resin is preferably 0.05 or more, 1.0 or more, or 3.0 or more, and 200 or less, 120 or less, or 80 or less. When the MFR is from 1.0 to 200, the MFR difference from polypropylene is reduced, enabling uniform mixing during melt-kneading, thereby obtaining a separator with high uniformity in thickness, permeability, and strength.

<Melt Flow Rate (MFR) of Microporous Layer (B)>

The upper limit of the melt flow rate (MFR) (MFR of a single layer) of the microporous layer (B) is, from the viewpoint of obtaining a microporous layer (B) with higher strength, preferably 8.0 g/10 min or less, and may be, for example, 6.0 g/10 min or less, 4.0 g/10 min or less, 3.0 g/10 min or less, 2.0 g/10 min or less, or 1.1 g/10 min or less. The lower limit of MFR (single layer MFR) of the microporous layer (B) is not limited from the viewpoint of favorable dendrite suppression effect, and may be 0.3 g/10 min or more, 0.35 g/10 min or more, 0.4 g/10 min or more, 0.45 g/10 mm or more, or 0.5 g/10 mm or more. The MFR of the microporous layer (B) is measured under a load of 2.16 kg and a temperature of 230° C.

That the MFR of the microporous layer (B) is 8.0 g/10 min or less means that the molecular weight of the polyolefin in the microporous layer (B) is somewhat high. When a polyolefin has a high molecular weight, the number of tie molecules that bind the crystallites together increases, which tends to produce the microporous layer (B) with high strength. An MFR of the microporous layer (B) of 0.3 g/10 min or more prevents the melt tension of the microporous layer (B) from becoming too high, thereby making it easier to obtain a separator that exhibits a favorable dendrite suppression effect.

The MFR of polypropylene of the microporous layer (B) is, from the viewpoint of obtaining the microporous layer (B) with higher strength, preferably 8.0 g/10 min or less, and may be, for example, 6.0 g/10 min or less, 4.0 g/10 min or less, 3.0 g/10 min or less, 2.0 g/10 min or less, or 1.1 g/10 min or less. The lower limit of MFR (MFR of a single layer) of the microporous layer (B) is not limited from the viewpoint of favorable dendrite suppression, and may be, for example, 0.3 g/10 min or more, 0.35 g/10 min or more, 0.4 g/10 min or more, 0.45 g/10 min or more, or 0.5 g/10 min or more.

<Pentad Fraction of Microporous Layer (B)>

The lower limit of the pentad fraction of polypropylene in the microporous layer (B) may, from the viewpoint of obtaining a microporous layer with low permeability, preferably be 94.0% or higher, for example, 95.0% or higher, 96.0% or higher, 96.5% or higher, 97.0% or higher, 97.5% or higher, 98.0% or higher, 98.5% or higher, or 99.0% or higher. The upper limit of the pentad fraction of polypropylene is not limited, and may be 99.9% or less, 99.8% or less, or 99.5% or less. The pentad fraction of polypropylene is measured by $^{13}$C-NMR (nuclear magnetic resonance method).

A pentad fraction of polypropylene of 94.0% or more indicates that the crystallinity of polypropylene is high. A separator obtained by the stretch opening method, in particular the dry method, opens pores by stretching amorphous portions between crystallites, and therefore, when the crystallinity of polypropylene is high, the porosity is favorable and the permeability can also be kept low, which enables high output of a battery.

<Area-Averaged Long Pore Diameter of Microporous Layer (B)>

The area-averaged long pore diameter (hereinafter simply referred to as "area-averaged long pore diameter") of pores in the ND-MD sectional observation of the microporous layer (B) is from 150 nm to 500 nm, preferably from 160 nm to 400 nm, and more preferably from 170 nm to 350 nm. When the area-averaged long pore diameter of the microporous layer (B) is within this range, dendrite short circuits can be suppressed more effectively. The area-averaged long pore diameter in the ND-MD section of the microporous layer (B) may be larger than the area-averaged long pore diameter of the microporous layer (A).

<Porosity of Microporous Layer (B)>

The porosity of the microporous layer (B) is preferably 20% or more from the viewpoint of avoiding clogging in an electric storage device and obtaining favorable permeability of a separator, and is preferably 70% or less from the viewpoint of maintaining the strength of the separator. The porosity of the microporous layer (B) is more preferably from 25% to 65%, further preferably from 30% to 60%, and particularly preferably from 35% to 60%.

<Thickness of Microporous Layer (B)>

The thickness of the microporous layer (B) of the present disclosure, from the viewpoint of high energy density of an electric storage device and the like, may preferably be 10 μm or less, for example, 8 μm or less, 7 μm or less, 6 μm or less, 5 μm or less, 4.5 μm or less, or 4 μm or less. The lower limit of the thickness of the microporous layer (B), from the viewpoint of strength and the like, may preferably be 1 μm or more, for example, 2 μm or more, 3 μm or more, or 3.5 μm or more.

The ratio $L_B/L_A$ of the area-averaged long pore diameter $L_B$ of the microporous layer (B) to the area-averaged long pore diameter $L_A$ of the microporous layer (A) is preferably from 1.1 to 6.0. By setting the $L_B/L_A$ to 1.1 or more, the pore diameter of the microporous layer (A) is sufficiently small and the pore diameter of the microporous layer (B) is sufficiently large, and dendrite short circuits in an electric storage device can be effectively suppressed. By setting the $L_B/L_A$ to 6 or less, a separator with favorable porosity and permeability can be obtained. $L_B/L_A$ is preferably from 1.1 to 4.0, more preferably from 1.15 to 3.0, especially from 1.2 to 2.5, and most preferably from 1.3 to 2.0.

<Layer Structure of Separator Substrate>

The separator base material (herein also simply referred to as "separator substrate") for electric storage devices is composed of at least one layer of the microporous layer (A) and at least one layer of the microporous layer (B). The separator substrate may have a multilayer structure of three or more layers in which at least one of the microporous layer (A) and/or the microporous layer (B) has two or more layers. Examples of the multilayer structure include a two-layer structure of microporous layer (A)/microporous layer (B) and a three-layer structure of microporous layer (A)/microporous layer (B)/microporous layer (A). The separator substrate may include a layer other than the microporous layer (A) and the microporous layer (B). Examples of the layer other than the microporous layer (A) and the microporous layer (B) include a microporous layer mainly composed of polyolefin other than (A) and (B), a layer containing an inorganic material, and a layer containing a heat-resistant resin. For example, the separator substrate may have a multilayer structure with four or more layers, such as microporous layer (A)/microporous layer (B)/microporous layer (C)/microporous layer (A). From the viewpoint of ease of manufacturing, suppression of separator curling, and the like, a symmetrical multilayer structure is preferable.

As for the layer structure of the separator substrate for electric storage devices, it is preferable that at least one layer of the microporous layer (A) and at least one layer of the microporous layer (B) are adjacent to each other from the viewpoint of effectively suppressing dendrite short circuits. It is more preferable that the microporous layer (A) constitutes the outermost layer on at least one side of the separator substrate, and it is particularly preferable that the microporous layer (A) constitutes the outermost layer on both sides of the separator substrate. When the microporous layer (A) constitutes the outermost layer, dendrite short circuits tend to be easily suppressed.

<Thickness of Separator Substrate>

The upper limit of the thickness of the separator substrate is, from the viewpoint of high energy density of an electric storage device, and the like, preferably 25 μm or less, and may be, for example, 22 μm or less, 20 μm or less, 18 μm or less, 16 μm or less, 14 μm or less, or 12 μm or less. The lower limit of the thickness of the separator substrate is, from the viewpoint of strength, and the like, preferably 6 μm or more, and may be, for example, 7 μm or more, 8 μm or more, 9 μm or more, or 10 μm or more.

<Permeability (Air Permeability) of Separator Substrate>

The upper limit of the permeability of a separator substrate is preferably 300 sec/100 $cm^3$ or less, 290 sec/100 $cm^3$ or less, 280 sec/100 $cm^3$ or less, 270 sec/100 $cm^3$ or less, 260 sec/100 $cm^3$ or less, or 250 sec/100 $cm^3$ or less. The lower limit of the permeability of a separator substrate is not limited, but may preferably be 10 sec/100 $cm^3$ or more, 20 sec/100 $cm^3$ or more, 30 sec/100 $cm^3$ or more, 40 sec/100 $cm^3$ or more, 50 sec/100 $cm^3$ or more, 60 sec/100 $cm^3$ or more, or 70 sec/100 $cm^3$ or more.

<Porosity of Separator Substrate>

The porosity of a separator substrate is preferably 20% or more from the viewpoint of avoiding clogging in an electric storage device and obtaining favorable permeability of a separator, and is preferably 70% or less from the viewpoint of maintaining the strength of the separator. The porosity of a separator substrate is more preferably from 25% to 65%, more preferably from 30% to 60%, and particularly preferably from 35% to 60%.

<Puncture Strength of Separator Substrate>

The lower limit of the puncture strength of a separator substrate in terms of 16 μm thickness is preferably 260 gf or more, more preferably 270 gf or more, 280 gf or more, 290 gf or more, or 300 gf or more, and particularly preferably 320 gf or more. The upper limit of the puncture strength of a separator substrate is not limited, but may, when converting the thickness of the separator substrate to 16 μm, preferably be 600 gf or less, for example, 580 gf or less, or 550 gf or less.

<Thermal Shrinkage Rate of Separator Substrate>

A separator substrate preferably has a thermal shrinkage rate in the width direction (TD) of from −1.0% to 3.0% after heat treatment at 150° C. for 1 hour. This means that the separator substrate has very little thermal shrinkage in the TD even at high temperatures. When the thermal shrinkage rate is 3.0% or less, short circuits can be effectively suppressed at high temperatures. The reason why the thermal shrinkage rate is −1.0% or higher is that the substrate expands in the TD when the thermal shrinkage rate is measured, and the thermal shrinkage rate may become a negative value smaller than 0%. The thermal shrinkage rate may be 0% or higher, or higher than 0%. Examples of a method for manufacturing a separator substrate whose thermal shrinkage rate is from −1.0% to 3.0% include a method for manufacturing a separator by uniaxial stretching of MD, and preferably a method for manufacturing a separator by dry method of uniaxial stretching. In the method for manufacturing a separator by stretching in MD and TD biaxial directions as represented by a wet separator, the thermal shrinkage of TD is generally very large, whereas in the dry separator of uniaxial stretching, a separator substrate with a thermal shrinkage rate of from −1.0% to 3.0% can be easily obtained.

<<Method For Manufacturing Separator For Electric Storage Devices>>

A method for manufacturing a separator for electric storage devices includes: a melt-extrusion process for melting and extruding a resin composition (hereinafter also referred to as “polypropylene resin composition”) mainly composed of polypropylene to obtain a resin sheet (precursor sheet); and a pore-forming process in which the resulting precursor sheet is made porous by opening holes in the sheet. The method for manufacturing a microporous layer can be broadly classified into a dry method that does not use solvents in a pore-forming process and a wet method that uses a solvent.

Examples of the dry method include a method in which a polypropylene resin composition is melt-kneaded and extruded, and then a polypropylene crystal interface is exfoliated by heat treatment and stretching, or a method in which a polypropylene resin composition and an inorganic filler are melt-kneaded and molded into a film shape, and then an interface between the polypropylene and the inorganic filler is exfoliated by stretching.

Examples of the wet method include a method in which a polypropylene resin composition and a pore-forming material are melt-kneaded and molded into a film shape, stretched if necessary, and then the pore-forming material is extracted, and a method in which a polypropylene resin composition is dissolved and then immersed in a poor solvent for polypropylene to solidify the polypropylene and remove the solvent at the same time.

For melt kneading of a polypropylene resin composition, a single screw extruder and a twin screw extruder can be used, and in addition to these, for example, a kneader, a lab-plant mill, kneading rolls, and a Banbury mixer can also be used.

A polypropylene resin composition may optionally contain a resin other than polypropylene, an additive, and the like, depending on the manufacturing method of a microporous layer, or depending on the physical properties of a desired microporous layer. Examples of the additive include a pore-forming material, a fluorinated flow modifier, a wax, a crystal nucleus material, an antioxidant, a metal soap such as aliphatic carboxylic acid metal salt, a UV absorber, a light stabilizer, an antistatic agent, an antifogging agent, and a colored pigment. Examples of the pore-forming material include a plasticizer, an inorganic filler, or a combination thereof.

Examples of the plasticizer include a hydrocarbon such as liquid paraffin or paraffin wax; an ester such as dioctyl phthalate or dibutyl phthalate; and a higher alcohol such as oleyl alcohol or stearyl alcohol.

Examples of the inorganic filler include: oxide ceramics such as alumina, silica (silicon oxide), titania, zirconia, magnesia, ceria, yttria, zinc oxide, or iron oxide; nitride ceramics such as silicon nitride, titanium nitride, and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth, silica sand; and glass fiber.

As the manufacturing method for a separator substrate, a dry lamellar crystal pore opening process, in which a polypropylene crystal interface is exfoliated by heat treatment and stretching, is preferable. Here, as the method for manufacturing a separator substrate composed of the microporous layer (A) and the microporous layer (B), at least one of the following methods (i) and (ii) is preferably used:

(i) a method for manufacturing a separator substrate by co-extrusion film formation, wherein the microporous layer (A) and the microporous layer (B) are co-extruded and subjected to an annealing process, a cold stretching process, a thermal stretching process, and a thermal relaxation process; and (ii) a method for manufacturing a separator substrate by lamination, wherein the microporous layer (A) and the microporous layer (B) are extruded separately, laminated together by lamination, and then subjected to an annealing process, a cold stretching process, a thermal stretching process, and a thermal relaxation process.

Of the co-extrusion process (i) and lamination process (ii), the co-extrusion process (i) is preferable from the viewpoint of manufacturing cost and the like. In the co-extrusion process (i), for the extrusion film formation conditions of the microporous layers (A) and (B), it is preferable to discharge a resin at the lowest possible temperature and to quench the resin effectively by blowing low-temperature air. After film formation, quenching by air is preferable, and the temperature of air to be blown is preferably 20° C. or lower, and more preferably 15° C. or lower. By blowing cold air controlled at such a low temperature, the resin after film formation is uniformly oriented to MD.

In both the co-extrusion process (i) and lamination process (ii), the method for manufacturing the separator substrate may include an annealing process after extrusion film formation. The annealing process tends to grow the crystal structure of the microporous layers (A) and (B) and improve the porosity. Annealing at a specific temperature for a predetermined time tends to enable both the microporous layers (A) and (B) to have a favorable area-averaged long pore diameter. The reason for this is thought to be because a crystal grows without disrupting the crystal structure and high porosity is obtained. In the annealing process, it is preferable that an annealing treatment is performed in the temperature range of preferably from 115° C. to 160° C. for preferably 20 minutes or more, more preferably 60 minutes or more, from the viewpoint of obtaining a favorable area-averaged long pore diameter and maintaining high output of an electric storage device, while also expressing dendrite suppression effect.

The method for manufacturing a separator substrate may include a stretching process after the annealing process. Either uniaxial or biaxial stretching may be used as the stretching process. Although not limited, uniaxial stretching is preferable from the viewpoints of manufacturing cost and reduction of thermal shrinkage of TD when a dry method is used. Biaxial stretching is preferable from the viewpoint of improving the strength of a resulting separator substrate. Examples of the biaxial stretching include a simultaneous biaxial stretching method, a sequential biaxial stretching method, a multi-stage stretching method, and a multiple stretching method.

In order to control thermal shrinkage of a separator substrate, a thermal treatment process may be performed for the purpose of thermal fixation after a stretching process or after a pore-forming process. The heat treatment process may include a stretching operation performed at a predetermined temperature and a predetermined drawing ratio for the purpose of adjusting physical properties, and/or a relaxation operation performed at a predetermined temperature and a predetermined relaxation ratio for the purpose of reducing shrinkage stress applied during film forming and stretching. The relaxation operation may be performed after the stretching operation is performed. These thermal treatment processes may be performed using a tenter or a roll stretching machine.

The resulting separator substrate may be used as it is as a separator for electric storage devices. Optionally, a further layer such as a coating layer may be provided on one or both sides of the separator substrate, and a surface treatment such as corona treatment may be applied as necessary.

<<Electric Storage Device>>

The electric storage device of the present disclosure is provided with the separator for electric storage devices of the present disclosure. The electric storage device of the present disclosure includes a positive electrode and a negative electrode, and the separator for electric storage devices of the present disclosure is preferably arranged between the positive electrode and the negative electrode. Since a dendrite generated in an electric storage device grows through pores on the surface of a separator and has a high penetrating force to the positive electrode side surface, a macroporous layer (A) with relatively high melt tension and small pore diameter can be arranged on the surface of the separator and the growth of dendrites in the separator can be effectively suppressed, resulting in a tendency to effectively suppress dendrite short circuits.

Examples of the electric storage device include, but are not limited to, a lithium secondary battery (including an all-solid-state lithium battery, a lithium sulfur battery, and a lithium air battery), a lithium-ion secondary battery, a sodium secondary battery, a sodium ion secondary battery, a magnesium secondary battery, a magnesium ion secondary battery, a calcium secondary battery, a calcium ion secondary battery, an aluminum secondary battery, an aluminum ion secondary battery, a nickel metal hydride battery, a nickel cadmium battery, an electric double-layer capacitor, a lithium-ion capacitor, a redox flow battery, and a zinc-air battery. Among these, from the viewpoint of high energy density, low cost, and durability, a lithium secondary battery, a lithium-ion secondary battery, or a lithium-ion capacitor is preferable, and a lithium-ion secondary battery is more preferable.

For example, an electric storage device can be prepared by overlapping a positive electrode and a negative electrode via the separator described above and winding them if necessary to form a layered electrode body or a wound electrode body, then loading the body into an outer packaging body, connecting the positive and negative electrodes to the positive and negative electrode terminals of the outer packaging body via leads or the like, and further, sealing the outer packaging body after injecting a non-aqueous electrolytic solution containing a non-aqueous solvent such as chain or cyclic carbonate and an electrolyte such as lithium salt into the outer packaging body.

The present electric storage device is more preferably a lithium-ion secondary battery, and herein, a preferable aspect of the lithium-ion secondary battery is described.

A positive electrode is not particularly limited, as long as the positive electrode acts as a positive electrode of a lithium-ion secondary battery, and any known positive electrode can be used. A positive electrode preferably contains one or more materials selected from the group consisting of materials capable of absorbing and releasing lithium ions as a positive electrode active material. From the viewpoints of battery capacity and safety, preferable examples of the positive electrode include a lithium cobalt oxide represented by $LiCoO_2$, a spinel lithium manganese oxide represented by $Li_2Mn_2O_4$, a spinel lithium nickel manganese oxide represented by $Li_2Mn_{1.5}Ni_{0.5}O_4$, a lithium nickel oxide represented by $LiNiO_2$, a lithium-containing composite metal oxide represented by $LiMO_2$ (M indicates two or more elements selected from the group consisting of Ni, Mn, Co, Al and Mg), and a lithium iron phosphate compound represented by $LiFePO_4$. Among these, from the viewpoint of high safety and long-term stability, more preferable examples thereof include a lithium cobalt oxide represented by $LiCoO_2$, a lithium nickel oxide represented by $LiNiO_2$, a lithium-containing composite metal oxide represented by $LiMO_2$ (M represents two or more elements selected from the group consisting of Ni, Mn, Co, Al, and Mg), and a lithium iron phosphate compound represented by $LiFePO_4$, and particularly preferably a lithium iron phosphate compound represented by $LiFePO_4$.

A negative electrode is not particularly limited as long as the negative electrode acts as a negative electrode of a lithium-ion secondary battery, and may be any known negative electrode. A negative electrode preferably contains one or more materials selected from the group consisting of a material capable of absorbing and releasing lithium ions and metal lithium as a negative electrode active material. In other words, a negative electrode preferably contains one or more materials selected from the group consisting of metal lithium, a carbon material, a material containing an element capable of forming an alloy with lithium, and a lithium-containing compound as a negative electrode active material. Examples of such a material include, in addition to metal lithium, a carbon material represented by hard carbon, soft carbon, artificial graphite, natural graphite, graphite, pyrolytic carbon, coke, glassy carbon, a calcined organic polymer compound, a mesocarbon micro-bead, carbon fiber, activated carbon, graphite, carbon colloids, or carbon black.

EXAMPLES

<<Measurement and Evaluation Method>>

[Measurement of Melt Flow Rate (MFR)]

The melt flow rate (MFR) of a microporous layer (A) was measured under the conditions of 230° C. and 2.16 kg load (unit is g/10 min) in accordance with JIS K 7210. The MFR of polypropylene was measured under the conditions of 230° C. and 2.16 kg load in accordance with JIS K 7210. The melt flow rate (MFR) of polyethylene was measured under the conditions of 230° C. and 2.16 kg load in accordance with JIS K 7210.

[Measurement of Mw and Mn by GPC (Gel Permeation Chromatography)]

A calibration curve was prepared by measuring standard polystyrene using Agilent PL-GPC 220 under the following conditions. A chromatograph was obtained by measuring a sample polymer under similar conditions, and based on the calibration curve, the weight average molecular weight (Mw), the number average molecular weight (Mn), and the MWD (Mw/Mn), which is the weight average molecular weight (Mw) divided by the number average molecular weight (Mn) of the polymer in terms of polystyrene, were calculated according to the following conditions.

Column: TSKgel GMHHR-H (20) HT (7.8 mm I.D.×30 cm)×2

Mobile phase: 1,2,4-Trichlorobenzene

Detector: RI

Column temperature: 160° C.

Sample concentration: 1 mg/ml

Calibration curve: Polystyrene

[Measurement of Melt Tension]

The melt tension (mN) of a microporous film was measured using a capillograph manufactured by Toyo Seiki Seisaku-sho, Ltd. under the following conditions.

Capillary: 1.0 mm in diameter and 20 mm in length

Cylinder extrusion speed: 2 mm/min

Drawing speed: 60 m/min.

Temperature: 230° C.

[Measurement of Pentad Fraction]

The pentad fraction of polypropylene was calculated by the peak height method from 13C-NMR spectra attributed according to the description in Polymer Analysis Handbook (edited by the Japanese Society for Analytical Chemistry). The $^{13}C$-NMR spectrum was measured by dissolving polypropylene pellets in o-dichlorobenzene-d using JEOL-ECZ500, at a measurement temperature of 145° C. and a number of scans of 25,000.

[Measurement of Thickness (μm)]

The thickness (μm) of a separator substrate was measured at room temperature of 23±2° C. using the Digimatic Indicator IDC112 manufactured by Mitutoyo Corporation. The thickness of each microporous layer was calculated from an image data by sectional SEM obtained by the evaluation method of area-averaged long pore diameter described below.

[Measurement of Porosity (%)]

A sample with dimensions of 10 cm×10 cm square was cut from a separator or a microporous layer, the volume ($cm^3$) and the weight (g) were determined, and from them and the density ($g/cm^3$), the porosity was calculated using the following formula.

$$\text{porosity (\%)}=(\text{volume}-\text{weight}/\text{density})/\text{volume}\times 100$$

[Permeability (Seconds/100 $cm^3$)]

The air permeability of a separator substrate was measured using a Gurley permeability meter in accordance with JIS P-8117 (seconds/100 $cm^3$).

[Permeability After High Temperature Treatment (Seconds/100 $cm^3$)]

A sample obtained by cutting a separator substrate into a square of 100 mm in each MD/TD was placed in a hot-air dryer (manufactured by Yamato Scientific co., ltd., DF1032) and thermally treated at 140° C. for 30 minutes at normal pressure in the atmosphere. The sample was removed from the hot-air dryer, cooled at 25° C. for 10 minutes, and then the air permeability of the separator substrate (seconds/100 $cm^3$) was measured using a Gurley permeability meter in accordance with JIS P-8117.

[TD Thermal Shrinkage Rate (%)]

A sample obtained by cutting a separator substrate into a square of 50 mm in each MD/TD was placed on copy paper in a hot-air dryer (manufactured by Yamato Scientific co., ltd., DF1032) and thermally treated at 150° C. for 1 hour under normal pressure in the atmosphere.

The sample was removed from the hot-air dryer, cooled at 25° C. for 10 minutes, and then the dimensional shrinkage was determined.

thermal shrinkage rate (%)=(dimensions before heating (mm)−dimensions after heating (mm))/(dimensions before heating (mm))×100

[Puncture Strength]

A needle with a hemispherical tip of 0.5 mm radius was prepared, and a separator was placed between two plates with an opening of 11 mm in diameter (dia.), and the needle, the separator and the plates were set. A puncture test was performed using "MX2-50N" manufactured by IMADA Co., Ltd. under the conditions of a radius of curvature of 0.5 mm at the tip of the needle, a diameter of 11 mm at an opening of a separator holding plate, and a puncture speed of 25 mm/minute. The needle and the separator were brought into contact, and the maximum puncture load (or puncture strength (gf)) was measured. The puncture strength (gf) was divided by the separator thickness (μm) and multiplied by 16 μm to obtain the puncture strength (gf/16 μm) when the thickness of the separator substrate was converted to 16 μm.

[Area-Averaged Long Pore Diameter (nm)]

The area-averaged long pore diameter was measured by image analysis of sectional SEM observations. As a pretreatment, ruthenium staining was performed on a separator, and a sectional sample was prepared by freeze-fractionation. The section is the ND-MD plane. The sectional sample was fixed to an SEM sample stand for sectional observation using conductive adhesive (carbon-based), dried, and then coated with osmium using Osmium Coater (HPC-30W, manufactured by Vacuum Device Inc.) as a conductive treatment at an applied voltage adjustment knob setting of 4.5 and a discharge time of 0.5 seconds, thereby obtaining a sample for microscopy. Next, using a scanning electron microscope (manufactured by Hitachi High-Technologies Corporation, S-4800), any three points on the surface of a microporous film were observed under the conditions of an acceleration voltage of 1 kV, a detection signal LA10, a working distance of 5 mm, and a magnification of 5,000 times.

The observed image was binarized using the Otsu method with ImageJ image processing software to separate a resin portion from a pore portion, and the average length diameter of the pore portion was calculated. Pores with an area of 0.001 nm2 or less that straddled an imaging region and outside the imaging region were excluded from the measurement. The average diameter was calculated from the area of each pore by area averaging.

[Battery Performance (Dendrite Short Circuit Evaluation)]

As the electrolytic solution, an electrolytic solution containing 1 mol/L of $LiPF_6$ as a lithium salt in a mixture of ethylene carbonate and ethyl methyl carbonate at a volume ratio of 1:2 was used.

A mixture of lithium nickel manganese cobalt mixed oxide ($LiNi_{0.5}Co_{0.2}Mn_{0.3}O_2$) as a positive electrode active material, carbon black powder (manufactured by Timcal Corporation, product name: SuperP Li) as a conductivity aid, and PVDF as a binder in the weight ratio of mixed oxide: conductivity aid:binder=100:3.5:3 was applied to both sides of an aluminum foil as a positive electrode current collector with a thickness of 15 μm, dried, and pressed with a roll press to produce a both-side-coated positive electrode.

A mixture of graphite powder with a particle diameter of 22 μm (D50) (manufactured by Hitachi Chemical Company, product name: MAG) and binder (manufactured by ZEON Corporation, product name: BM400B) as a negative electrode active material and carboxymethylcellulose (manufactured by Daicel Corporation, product name: #2200) as a thickener in the weight ratio of graphite powder:binder: thickener=100:1.5:1.1 was applied to one side or both sides of a 10 μm thick copper foil as a negative electrode current collector, the solvent was dried and removed, and then the coated copper foil was pressed with a roll press to produce a single-side-coated negative electrode and a double-side-coated negative electrode, respectively.

The obtained positive electrode and negative electrode were layered in the order of single-side-coated negative electrode/double-side-coated positive electrode/double-side-coated negative electrode/double-side-coated positive electrode/single-side-coated negative electrode, with a separator prepared as described below sandwiched between the opposite sides of the respective active materials. The microporous layer (A) was arranged facing a negative electrode. The resulting layered body was then inserted into a bag (battery outer packaging) composed of a laminated film made of aluminum foil (40 μm thick) coated on both sides with a resin layer, with the terminals of the positive and negative electrodes protruding from the bag. The sheet-type lithium-ion secondary battery was then prepared by injecting 0.8 mL of the electrolytic solution prepared as described above into the bag and vacuum-sealing the bag.

The obtained sheet-type lithium-ion secondary battery was housed in a thermostatic chamber (manufactured by Futaba Kagaku Co., Ltd., product name: PLM-73S) set at 25° C., connected to a charge/discharge device (manufactured by Aska Electronics Corporation, product name: ACD-01), and allowed to stand for 16 hours. The battery was then initially charged and discharged by repeating a charge/discharge cycle of charging at a constant current of 0.05 C, charging at a constant voltage of 4.35V for 2 hours after the voltage reached 4.35V, and then discharging at a constant current of 0.2 C to 3.0V three times. 1 C refers to the current value at which the entire capacity of the battery is discharged in one hour.

After the initial charge/discharge, the battery was placed in a thermostatic chamber set at 10° C., and was subjected to a charge/discharge cycle of charging at a constant current of 1 C, charging at a constant voltage of 4.50V for 1 hour after the voltage reached 4.50V, then allowing the battery to stand still in an open circuit state for 1 hour, and then discharging to 3.0V at a constant current of 1 C, repeated 10 times, and the occurrence of dendrite short circuit was checked using 10 sheet-type lithium-ion secondary batteries each during this period, and the acceptance rate (%) was calculated from the number of sheet-type lithium-ion secondary batteries out of 10 in which no short circuits occurred. Here, the presence or absence of a dendrite short circuit was determined in such a manner that a dendrite short circuit occurred when the voltage dropped by 0.3 V or more while the battery was left standing in an open circuit state after the end of charging, or when the battery was unable to be charged to 4.5 V within 2 hours during 1 C constant-current charging,

Example 1

[Preparation of Microporous Layer]

As the resin for the microporous layer (A), 100% by weight of a high molecular weight polypropylene resin (MFR (230° C.)=0.91 g/10 min, density=0.91 g/cm3) was melted in a 2.5-inch extruder and fed using a gear pump to both outer layers of a two-type, three-layer co-extrusion T-die. As the resin for the microporous layer (B), 95% by weight of a high molecular weight polypropylene resin (MFR (230° C.)=0.91 g/10 min, density=0.91 g/cm$^3$) and 5% by weight of a thermoplastic elastomer (hydrogenated SEBS in the Table) (MFR (230° C.)=0.8) were mixed by dry blending to obtain a resin material. The obtained resin material was melted in a 2.5-inch extruder and fed using a gear pump to the inner layer of the two-type, three-layer co-extrusion T-die. The temperature of the T-die was set at 240° C., and after the molten polymer was discharged from the T-die, a precursor sheet having an A/B/A layer structure with a thickness of about 14 μm was obtained by winding the discharged resin on a roll while cooling the discharged resin with blown air. Here, the TD lip width of the T-die was set at 500 mm, the distance between the lips of the T-die (lip clearance) was set at 2.4 mm, and discharge was performed under the condition of a 6 kg/h discharge rate.

The obtained precursor was then placed in a dryer and annealed at 150° C. for 180 minutes. The annealed precursor was then cold-drawn by 30% at room temperature, placed in an oven at 140° C. without shrinkage of the drawn film, hot-drawn to 180%, and then relaxed by 30% to obtain a separator substrate having a three-layer structure composed of A/B/A layers. The structure, physical properties, and battery performance evaluation results of the obtained separator substrate are shown in Table 1.

Examples 2 to 10, Comparative Examples 1, 2

A microporous film was obtained according to the same method as in Example 1, except that the raw materials were changed as shown in Table 1, and the obtained separator was evaluated.

Comparative Example 3

As the resin for the microporous layer (A), 100% by weight of a high molecular weight polypropylene resin (MFR (230° C.)=0.91 g/10 min, density=0.91 g/cm$^3$) was melted in a 2.5-inch extruder and fed into a single layer T-die using a gear pump. The temperature of the T-die was set at 240° C., and after the molten polymer was discharged from the T-die, a precursor sheet of the microporous layer (A) with a thickness of about 5 μm was obtained by winding the discharged resin on a roll while cooling the discharged resin with blown air. Here, the TD lip width of the T-die was set at 500 mm, the distance between the lips of the T-die (lip clearance) was set at 2.4 mm, and discharge was performed under the condition of a 6 kg/h discharge rate.

As the resin of the inner layer, 100% by weight of a polyethylene resin (MFR (230° C.)=1.5 g/10 min, density=0.96 g/cm$^3$) was melted in a 2.5-inch extruder and fed into a single layer T-die using a gear pump. The temperature of the T-die was set at 210° C., and after the molten polymer was discharged from the T-die, a precursor sheet of the inner layer polyethylene layer with a thickness of about 5 μm was obtained by winding the discharged resin on a roll while cooling the discharged resin with blown air. Here, the TD lip width of the T-die was set at 500 mm, the distance between the lips of the T-die (lip clearance) was set at 2.4 mm, and discharge was performed under the condition of a 6 kg/h discharge rate.

Then, lamination was performed at 120° C. to obtain a three-layered precursor sheet having a three-layer structure of microporous layer (A)/polyethylene layer/microporous layer (A). The obtained precursor was then placed in a dryer and annealed at 120° C. for 180 minutes. The annealed precursor was then cold-drawn by 20% at room temperature, placed in an oven at 140° C. without shrinkage of the drawn film, hot-drawn to 180%, and then relaxed by 30% to obtain a separator substrate having a three-layer structure composed of A/polyethylene layer/A layers. The structure, physical properties, and battery performance evaluation results of the obtained separator substrate are shown in Table 1.

TABLE 1

| | | Example 1 | Example 2 | Example 3 | Example 4 | Example 5 | Example 6 | Example 7 |
|---|---|---|---|---|---|---|---|---|
| Structure of separator substrate | | A/B/A | A/B/A | A/B/A | A/B/A | A/B/A | A/B/A | A/B/A |
| Microporous layer (A) | Composition | PP | PP | PP | PP | PP | PP | PP |
| | MFR (g/10 min, 230° C.) | 0.91 | 0.91 | 0.91 | 0.91 | 0.91 | 0.91 | 0.91 |
| | Mw of PP | 690,000 | 690,000 | 690,000 | 690,000 | 690,000 | 690,000 | 690,000 |
| | MWD of PP | 5.4 | 5.4 | 5.4 | 5.4 | 5.4 | 5.4 | 5.4 |
| | Thickness (μm) | 4.1 | 4.0 | 4.5 | 3.9 | 3.8 | 4.0 | 4.5 |
| | Area-averaged long pore diameter (nm) | 204 | 181 | 187 | 194 | 195 | 199 | 201 |
| Microporous layer (B) | Composition | PP + 5% hydrogenated SEBS | PP + 5% hydrogenated SEBS | PP + 5% hydrogenated SEBS | PP + 5% hydrogenated SEBS | PP + 5% hydrogenated SEBS | PP + 5% hydrogenated SEBS | PP + 5% hydrogenated SEBS |
| | Compatibility with PP in additive | Incompatible | Incompatible | Incompatible | Incompatible | Incompatible | Incompatible | Incompatible |
| | Styrene content of additive (wt %) | 42 | 30 | 20 | 43 | 18 | 60 | 18 |

TABLE 1-continued

| | | | | | | | | |
|---|---|---|---|---|---|---|---|---|
| | MFR of additive (g/10 min, 230° C.) | 0.8 | 5.0 | 13.0 | 3.0 | 4.5 | 0.3 | 5.0 |
| | MFR (g/10 min, 230° C.) | 0.91 | 0.91 | 0.91 | 0.91 | 0.91 | 0.91 | 0.91 |
| | Mw of PP | 690,000 | 690,000 | 690,000 | 690,000 | 690,000 | 690,000 | 690,000 |
| | MWD of PP | 5.4 | 5.4 | 5.4 | 5.4 | 5.4 | 5.4 | 5.4 |
| | Thickness (μm) | 4.1 | 4.0 | 4.5 | 3.9 | 3.8 | 4.0 | 4.5 |
| | Area-averaged long pore diameter (nm) | 241 | 234 | 240 | 230 | 262 | 224 | 261 |
| | Area-averaged long pore diameter ratio (B layer/A layer) | 1.18 | 1.30 | 1.28 | 1.18 | 1.34 | 1.13 | 1.30 |
| Separator | Thickness (μm) | 12.5 | 12.1 | 13.7 | 11.8 | 11.6 | 12.0 | 13.6 |
| | Porosity | 47.7 | 45.5 | 48.0 | 43.3 | 44.6 | 41.2 | 44.7% |
| | TD thermal shrinkage rate | 0.2% | 0.1% | 0.1% | 0.1% | 0.0% | 0.2% | 0.1% |
| | Puncture strength (gf) | 252 | 255 | 275 | 250 | 244 | 267 | 249 |
| | Puncture strength (gf/16μ) | 323 | 337 | 321 | 338 | 336 | 355 | 293 |
| | Permeability (sec) | 236 | 234 | 254 | 232 | 230 | 244 | 243 |
| | Permeability after high temperature treatment (sec) | 240 | 241 | 256 | 235 | 234 | 246 | 245 |
| Battery performance | Dendrite short circuit evaluation (Acceptance %) | 60% | 70% | 70% | 60% | 80% | 50% | 70% |

| | | Example 8 | Example 9 | Example 10 | Comparative Example 1 | Comparative Example 2 | Comparative Example 3 |
|---|---|---|---|---|---|---|---|
| Structure of separator substrate | | A/B/A | A/B/A | A/B/A | A/B/A | A/B/A | A/B/A |
| Microporous layer (A) | Composition | PP | PP | PP | PP | PP | PP |
| | MFR (g/10 min, 230° C.) | 0.91 | 0.44 | 0.91 | 0.91 | 0.91 | 0.91 |
| | Mw of PP | 690,000 | 850,000 | 690,000 | 690,000 | 690,000 | 690,000 |
| | MWD of PP | 5.4 | 4.9 | 5.4 | 5.4 | 5.4 | 5.4 |
| | Thickness (μm) | 4.2 | 4.0 | 4.5 | 4.4 | 4.2 | 4.2 |
| | Area-averaged long pore diameter (nm) | 208 | 148 | 178 | 205 | 195 | 242 |
| Microporous layer (B) | Composition | PP + 5% hydrogenated CEBC | PP + 8% hydrogenated SEBS | PP + 5% C2/C8 elastomer | PP + 5% long-chain branched PP | PP | PE |
| | Compatibility with PP in additive | Incompatible | Incompatible | Incompatible | Compatible | — | — |
| | Styrene content of additive (wt %) | 0 | 18 | — | — | — | — |
| | MFR of additive (g/10 min, 230° C.) | 2.5 | 4.5 | 7.0 | 1.0 | — | — |
| | MFR (g/10 min, 230° C.) | 0.91 | 0.51 | 0.91 | 0.91 | 0.91 | 1.50 |
| | Mw of PP | 690,000 | 810,000 | 690,000 | 690,000 | 690,000 | — |
| | MWD of PP | 5.4 | 4.4 | 5.4 | 5.4 | 5.4 | — |
| | Thickness (μm) | 4.2 | 4.0 | 4.5 | 4.4 | 4.2 | 4.2 |
| | Area-averaged long pore diameter (nm) | 241 | 226 | 238 | 209 | 206 | 557 |

TABLE 1-continued

| | | | | | | | |
|---|---|---|---|---|---|---|---|
| | Area-averaged long pore diameter ratio (B layer/A layer) | 1.16 | 1.53 | 1.10 | 1.02 | 1.05 | 2.30 |
| Separator | Thickness (μm) | 12.8 | 12.2 | 13.7 | 13.2 | 12.7 | 12.8 |
| | Porosity | 44.1% | 54.5% | 44.7% | 48.4% | 49% | 54.8% |
| | TD thermal shrinkage rate | 0.2% | 0.1% | 0.2% | 0.2% | 0.1% | 0.3% |
| | Puncture strength (gf) | 253 | 290 | 236 | 225 | 253.3 | 198 |
| | Puncture strength (gf/16μ) | 317 | 380 | 275 | 272 | 319 | 248 |
| | Permeability (sec) | 229 | 234 | 231 | 246 | 236 | 178 |
| | Permeability after high temperature treatment (sec) | 234 | 236 | 235 | 250 | 239 | >1000 |
| Battery performance | Dendrite short circuit evaluation (Acceptance %) | 50% | 90% | 40% | 30% | 30% | 60% |

INDUSTRIAL APPLICABILITY

The separator for electric storage devices of the present disclosure can be suitably used as a separator for electric storage devices, for example, lithium-ion secondary batteries.

The invention claimed is:

1. A separator for electric storage devices comprising:
   (A) a microporous layer mainly composed of (X) polypropylene
   (B) a microporous layer containing (Y) polypropylene identical or different from the polypropylene (X) and a thermoplastic elastomer that is incompatible with the polypropylene (Y),
   wherein an area-averaged long pore diameter of pores present in the microporous layer (B) in an ND-MD sectional observation of the microporous layer (B) is from 150 nm to 500 nm, and is larger than an area-averaged long pore diameter of the microporous layer (A),
   wherein the separator has a three-layer structure of microporous layer (A)/microporous layer (B)/microporous layer (A),
   wherein the microporous layer (A) constitutes the outermost layer on both sides of the separator substrate, and
   wherein the thermoplastic elastomer has a block copolymer structure having a styrene-containing unit.

2. The separator for electric storage devices according to claim 1, wherein the thermoplastic elastomer has a styrene content of from 1 wt % to 50 wt %, based on the total weight of the thermoplastic elastomer.

3. The separator for electric storage devices according to claim 1, wherein the separator for electric storage devices has a permeability of from 10 sec/100 $cm^3$ to 300 sec/100 $cm^3$.

4. The separator for electric storage devices according to claim 1, wherein the microporous layer (A) has a melt flow rate (MFR) of 0.7 g/10 min or less.

5. The separator for electric storage devices according to claim 1, wherein the microporous layer (B) has a melt flow rate (MFR) of 1.1 g/10 min or less.

6. An electric storage device comprising a positive electrode, a negative electrode, and the separator for electric storage devices according to claim 1 arranged between the positive electrode and the negative electrode.

7. The electric storage device according to claim 6, wherein the positive electrode contains lithium iron phosphate as a positive electrode active material.

* * * * *